United States Patent [19]
Folkerts et al.

[11] Patent Number: 5,982,591
[45] Date of Patent: Nov. 9, 1999

[54] MULTICHANNEL MAGNETIC HEAD WITH ADJACENT WRITE GAPS IN DIFFERENT PLANES

[75] Inventors: Wiepke Folkerts; Hans W. Van Kesteren, both of Eindhoven, Netherlands

[73] Assignee: U.S. Philips Corporation, New York, N.Y.

[21] Appl. No.: 08/800,444

[22] Filed: Feb. 18, 1997

[30] Foreign Application Priority Data

Mar. 8, 1996 [EP] European Pat. Off. ............. 96200637

[51] Int. Cl.⁶ .................................................. G11B 5/265
[52] U.S. Cl. ............................................................ 360/121
[58] Field of Search ..................................... 360/113, 121

[56] References Cited

U.S. PATENT DOCUMENTS

| | | | |
|---|---|---|---|
| 3,846,841 | 11/1974 | Lazzari et al. .......................... | 360/121 |
| 3,859,664 | 1/1975 | Chynoweth et al. .................... | 360/121 |
| 4,884,156 | 11/1989 | Miyakawa et al. ..................... | 360/121 |
| 5,208,714 | 5/1993 | Denison et al. ........................ | 360/113 |
| 5,210,667 | 5/1993 | Zammit .................................. | 360/113 |
| 5,212,611 | 5/1993 | Dee ........................................ | 360/113 |
| 5,229,895 | 7/1993 | Schwarz et al. ..................... | 360/77.12 |
| 5,241,439 | 8/1993 | Michalek et al. ...................... | 360/113 |
| 5,251,088 | 10/1993 | Coutellier et al. ..................... | 360/113 |
| 5,258,883 | 11/1993 | Ruigrok .................................. | 360/113 |
| 5,270,895 | 12/1993 | Ruigrok et al. ......................... | 360/126 |
| 5,307,217 | 4/1994 | Saliba ..................................... | 360/121 |
| 5,335,127 | 8/1994 | Nagata et al. .......................... | 360/113 |

FOREIGN PATENT DOCUMENTS

| | | |
|---|---|---|
| 8902884 | 6/1991 | European Pat. Off. . |
| 0519674A2 | 12/1992 | European Pat. Off. . |
| WO9630897 | 10/1996 | WIPO . |

OTHER PUBLICATIONS

IBM Technical Disclosure Bulletin, vol. 15, No. 6, Nov. 1972, B.W. Kington, "Interleaved Multielement Magnetic Head", p. 2035, Figures 1, 2.

*Primary Examiner*—Brian E. Miller
*Attorney, Agent, or Firm*—David R. Treacy

[57] ABSTRACT

Integrated, juxtaposed head units of a magnetic head have transducing gaps directly adjacent a central plane transverse to the longitudinal direction of relative movement of a magnetic recording medium, adjacent transducing gaps being to opposite sides of the central plane. Head units adjoin each other so that a recording channel density of 100% is achieved. In one embodiment a common electrical conductor passes through a plurality of head units to one side of the central plane, and electrical connection tracks extending from a portion of the conductor form inductive transducing elements.

18 Claims, 7 Drawing Sheets

MULTICHANNEL MAGNETIC HEAD WITH ADJACENT WRITE GAPS IN DIFFERENT PLANES

BACKGROUND OF THE INVENTION

The invention relates to a magnetic head provided with a head face having a longitudinal direction in which a magnetic recording medium is relatively movable with respect to the magnetic head, and a transverse direction oriented transversely to the longitudinal direction, and further provided with transducing gaps terminating in the head face.

A magnetic head of this type is known from NL-A 8902884 (PHN 13.144). The known magnetic head manufactured in thin-film technology is provided with coplanar, spatially separated transducing gaps, particularly write gaps. The write gaps are bounded by a substrate and flux guides, the substrate and the flux guides extending as far as a head face. A face extending between the substrate and the flux guides is provided with electrically conducting write windings. Viewed in the longitudinal direction of the head face, these windings have end portions which are present between the flux guides and to which electrically conducting supply tracks are connected.

Although narrow tracks on a recording medium can be written with the known magnetic head, the achievable track density during writing is limited due to the configuration used for write gaps. Due to the write gaps which are spaced apart, the known magnetic head has a limited channel density, which results in spaced recording tracks during writing.

OBJECTS AND SUMMARY OF THE INVENTION

It is an object of the invention to provide a magnetic head of the type described in the opening paragraph, having a high channel density.

The magnetic head according to the invention is characterized by the presence of a structure having integrated, juxtaposed head units extending substantially transversely to the longitudinal direction and the transverse direction and each being provided with at least a transducing element and a transducing gap, while at least a transducing gap of the one head unit and at least a transducing gap of the other head unit of two adjacent head units—preferably every two adjacent head units—are present in mutually different planes oriented substantially transversely to the longitudinal direction, the transducing gaps extending at different sides of a plane oriented substantially transversely to the transverse direction. In the magnetic head according to the invention, head units, preferably all head units, directly adjoin each other so that a channel density of 100% is achievable. The magnetic head has the advantage that, in the case of an inductive transducing element, relatively narrow tracks can be written in an accurately adjacent manner on a recording medium such as a non-preformatted magnetic tape, or in the case of a magnetoresistive transducing element, relatively narrow tracks extending side by side can be read.

By writing recording tracks without any interspace on a recording medium, the available surface of the recording medium is used effectively.

At a given total head width, the maximal number of transducing gaps may be present in the magnetic head according to the invention. Consequently, a maximal data rate can be realized.

When a recording medium thus written is being read, a magnetic head position control can be used, in which the required servo information may be incorporated in data tracks. Due to the fact that adjacent tracks extend exactly parallel, less stringent requirements may be imposed on the accuracy of the mechanical control used. Instead of a mechanical servo system, an electronic system may be used during reading, in which system the magnetic head according to the invention is used with a read track width which is at least half the used write track width.

An embodiment of the magnetic head according to the invention is characterized in that at least a transducing gap of the one head unit and at least a transducing gap of the other head unit of two adjacent head units adjoin the same plane oriented substantially transversely to the transverse direction. With this embodiment, it is possible to realize a minimal effective space between the tracks on a recording medium.

An embodiment of the magnetic head according to the invention is characterized in that the transducing gaps, present in mutually different planes, of two adjacent head units each extend between two magnetically conducting individual poles terminating in the head face.

An embodiment of the magnetic head according to the invention is characterized in that the transducing gaps, present in mutually different planes, of two adjacent head units each extend between a magnetically conducting common pole terminating in the head face and an individual pole terminating in the head face. In this embodiment, adjacent head units share a pole, also referred to as flux guide, while the individual poles of adjacent head units are alternately present on either the one or the other side of the relevant pole.

An embodiment of the magnetic head according to the invention is characterized in that the individual poles of two adjacent head units adjoin the same plane oriented transversely to the transverse direction. With this embodiment, it is possible to realize a minimal effective space between the tracks on the recording medium so that a maximal track density upon recording is possible.

An embodiment of the magnetic head according to the invention is characterized in that the structure is a multilayer structure having layers extending substantially transversely to the head face, while at least a transducing gap of the one head unit and at least a transducing gap of the other head unit of two adjacent head units are present in mutually different layers. Said structure may be manufactured by means of a known layer technology, particularly a thin-film technology.

An embodiment of the magnetic head according to the invention is characterized by the presence of an electric conductor located in a plane oriented transversely to the longitudinal direction of the head face and extending through at least a plurality of head units, the conductor having branches proximate to at least a plurality of the relevant head units for forming individual inductive elements. The electric conductor with branches may be realized by means of known techniques.

An embodiment of the magnetic head according to the invention is characterized in that a winding for forming individual inductive elements is provided around at least a plurality of the individual poles.

Dependent on its use in scanning the recording medium, the magnetic head according to the invention may be implemented as a multichannel read head, write head or read/write head and is suitable for video, data, audio or multimedia uses.

The invention also relates to a device for storing information in, and/or reading information from, a magnetic recording medium such as a magnetic tape or a magnetic disk, using a magnetic head which is a read and/or write head.

The device according to the invention is provided with the magnetic head according to the invention and is also provided with means for moving the magnetic head relative to the recording medium. The magnetic head may be a magnetoresistive head for reading information, or an inductive head for reading and/or writing information.

These and other aspects of the invention will be apparent from and elucidated with reference to the embodiments described hereinafter.

DESCRIPTION OF THE PREFERRED EMBODIMENTS

Figure 1:
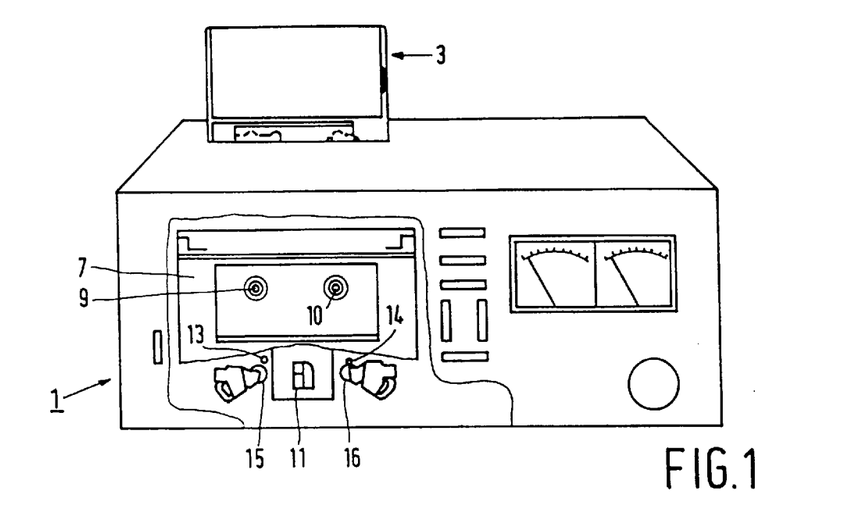
FIG. 1 shows a device according to the invention for writing signals in a tape-shaped recording medium.

The device shown in FIG. 1 is a magnetic tape apparatus 1 suitable for cooperation with a magnetic tape cassette 3. The cassette 3 is provided with a magnetic tape which is suitable for storing information. The apparatus 1, which is provided with a holder 7 for accommodating the cassette 3, constitutes a magnetic tape system with the cassette 3. The apparatus 1 has two reel spindles 9 and 10 for cooperation with reel hubs of the cassette 3. During use, the magnetic tape is moved along a magnetic head 11 according to the invention, used in the apparatus 1. To this end, the apparatus 1 may be provided with two capstans 13 and 14, and with two pressure rolls 15 and 16 cooperating with the capstans. The magnetic head 11, in this embodiment a write head, is used for simultaneously writing a plurality of parallel tracks on the magnetic tape. In addition to, or instead of the write head, the apparatus may be provided with a read head.

The magnetic head, being a write head, according to the invention, shown in FIGS. 2A, 2B, 2C and 2D is a thin-film magnetic head. The magnetic head has a head face 21 for cooperation with a magnetic recording medium 20 such as a magnetic tape which is movable relative to the magnetic head in the direction denoted by the arrow L. The direction L corresponds to the longitudinal direction of the head face 21 which has a transverse direction W extending transversely to the longitudinal direction.

The magnetic head comprises a non-magnetic substrate 23 of, for example, a ceramic material such as $Al_2O_3/TiC$ on which a multilayer structure is formed by means of known techniques, particularly lithographic techniques. This structure has a plurality of adjoining head units, being write units 25a and 25b, extending transversely to the longitudinal direction L and the transverse direction W, the write units 25a and the write units 25b alternating with each other. Each write unit 25a and 25b is provided with a transducing gap, being a write gap 27a, 27b, respectively, with all write gaps 27a being located in a first plane P1 extending transversely to the longitudinal direction L and all write gaps 27b being located in a second plane P2 extending parallel to the first plane P1.

The multilayer structure comprises a first soft-magnetic layer 24 of, for example NiFe, AlFeSi or CoNbZr deposited on the substrate 23. The first layer 24 is structured in such a way that it forms a magnetically conducting individual pole 29b for each write unit 25b. If the substrate 23 is magnetically conducting, an insulation layer should be present between the substrate 23 and the poles 29b. It is alternatively possible to structure a magnetically conducting substrate in such a way that the substrate itself acts a pole.

The multilayer structure also comprises a second and a third soft-magnetic layer 26, 28, respectively extending parallel to the first layer 24. In principle, the second layer 26 is uninterrupted, while the third layer 28 is structured and forms a magnetically conducting individual pole 29a for each write unit 25a. The second layer 26 forms a common pole 29c for the write units 25a and 25b, while each write gap 27a is present between an individual pole 29a and the common pole 29c, and each write gap 27b is present between an individual pole 29b and the common pole 29c. The various soft-magnetic layers are interconnected for forming appropriate magnetic circuits.

The write gaps 27a and 27b located in the mutually different planes P1 and P2 and comprising a non-magnetic material, for example an oxide such as $Al_2O_3$ or $SiO_2$, pairwise adjoin the same plane H transverse to the transverse direction W. The individual poles 29a and 29b of every two adjacent write units 25a and 25b also adjoin the same plane H.

Figure 2A:
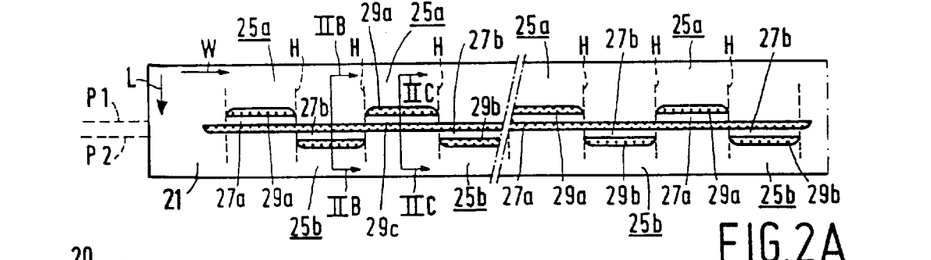
FIG. 2A is a diagrammatic front-elevational view of a first embodiment of the magnetic head according to the invention.
Figure 2B:
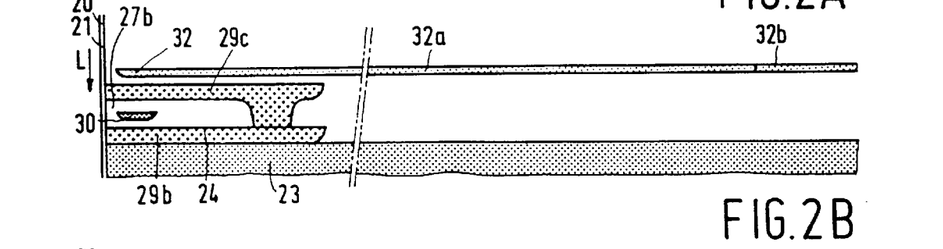
FIG. 2B is a diagrammatic cross-section taken on the line IIB—IIB of the first embodiment of the magnetic head.
Figure 2C:
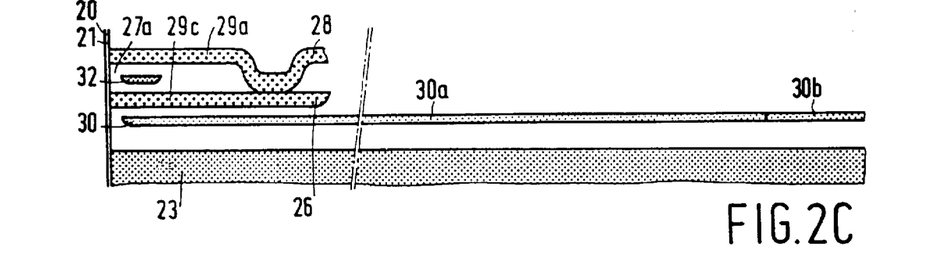
FIG. 2C is a diagrammatic cross-section taken on the line IIC—IIC of the first embodiment.
Figure 2D:
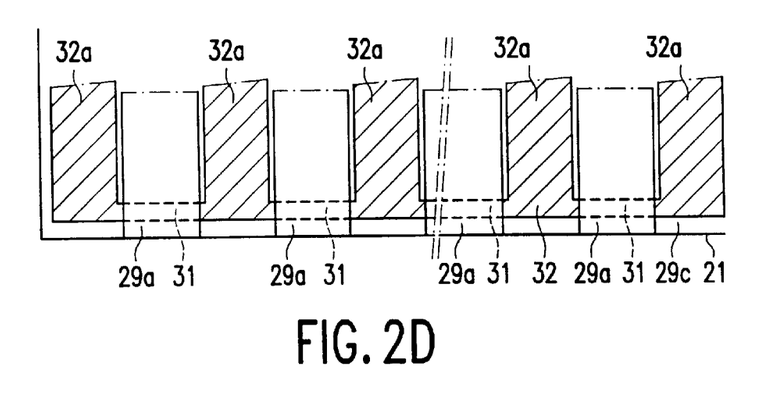
FIG. 2D is a diagrammatic plan view of the first embodiment.
Figures 3A, 3B:
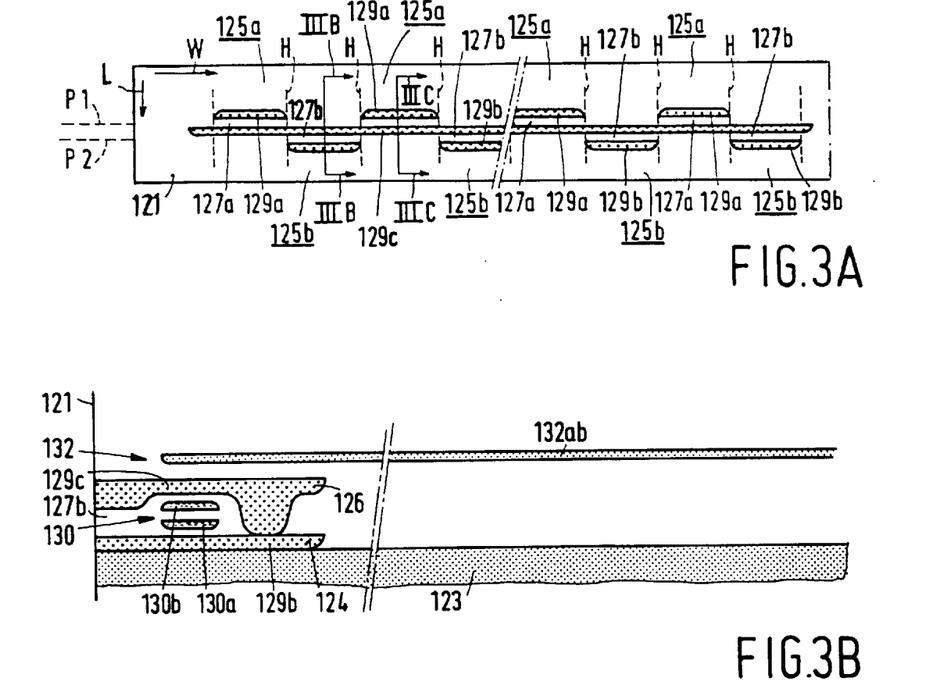
FIG. 3A is a diagrammatic front-elevational view of a second embodiment of the magnetic head according to the invention.
FIG. 3B is a diagrammatic cross-section taken on the line IIIB—IIIB of the second embodiment of the magnetic head.
Figure 3C:
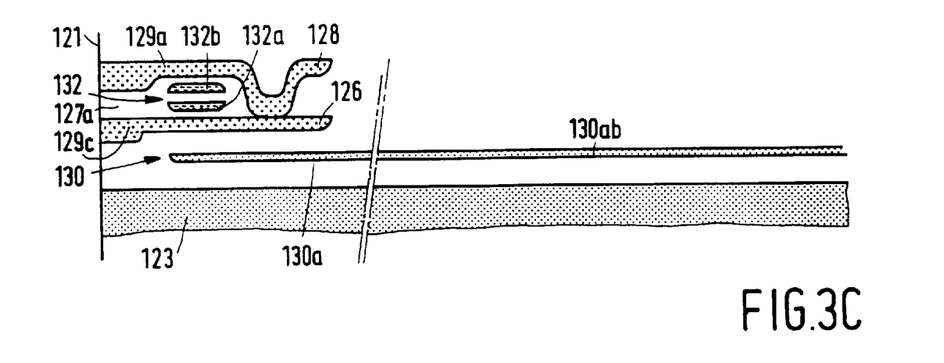
FIG. 3C is a diagrammatic cross-section taken on the line IIIC—IIIC of the second embodiment.
Figure 3D:
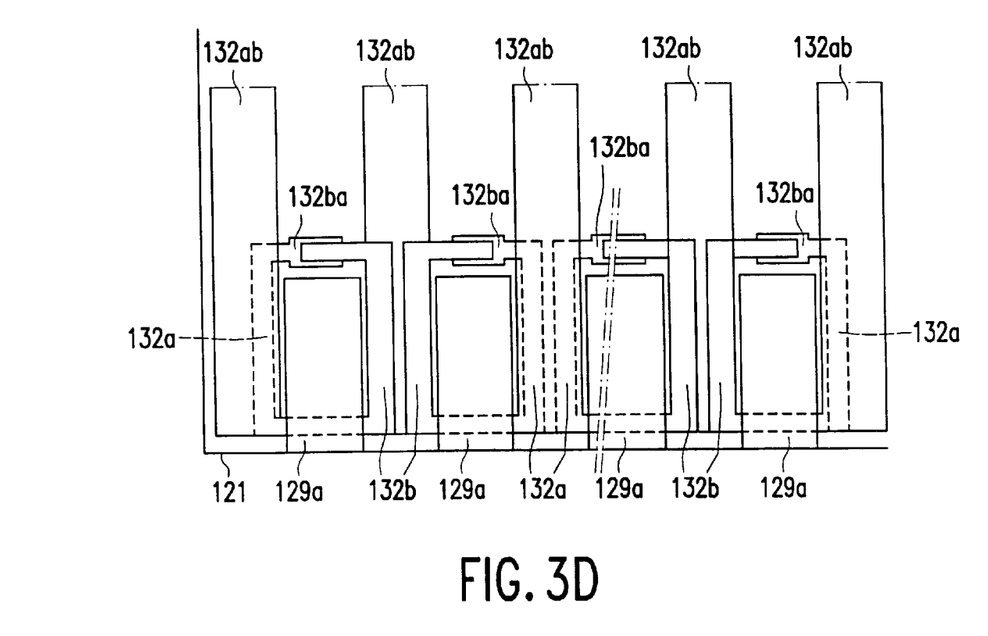
FIG. 3D is a diagrammatic plan view of the second embodiment.

The multilayer structure also comprises a first electric conductor 30 of, for example, Cu extending between the first and the second soft-magnetic layer 24, 26 and a second electric conductor 32 of, for example, Cu extending between the second and the third soft-magnetic layer 26, 28, respectively. The electric conductors 30 and 32, which are each formed by means of an electrically conducting layer, are each provided with branches in the form of connection tracks 30a and 32a, respectively, for forming individual inductive elements in the magnetic yokes formed by the poles. The connection tracks terminate in connection faces 30b and 32b. FIG. 2D shows the individual inductive elements by means of the reference numeral 31. As a protection of the multilayer structure, the magnetic head may be provided with a counterblock which is arranged in such a way that the multilayer structure is enclosed between the substrate and the counterblock. The counterblock may be formed from the same material as the material from which the substrate is formed.

The magnetic head according to the invention, shown in FIGS. 3A, 3B, 3C and 3D is particularly suitable for generating a strong write field. The magnetic head has a head face 121 for cooperation with a magnetic recording medium such as a magnetic tape or disc which is movable relative to the magnetic head in the direction denoted by the arrow L. The direction L corresponds to the longitudinal direction of the head face 121 which also has a transverse direction W transverse to the longitudinal direction.

The magnetic head comprises a substrate 123 on which a thin-film structure is formed. This structure is provided with a plurality of adjoining head units, being write units 125a and 125b, extending transversely to the longitudinal direction L and the transverse direction W, the write units 125a and the write units 125b alternating with each other. Each write unit 125a and 125b is provided with a transducing gap, being a write gap 127a, 127b, respectively, the write gaps 127a being located in a first plane P1 extending transversely to the longitudinal direction L and the write gaps 127b being located in a second plane P2 extending parallel to the first plane P1.

The thin-film structure comprises a first soft-magnetic layer 124 deposited on the substrate 123 and being structured in such a way that it forms a magnetically conducting individual pole 129b for each write unit 125b.

The thin-film structure also comprises a second and a third soft-magnetic layer 126, 128 respectively, extending parallel to the first layer 124. The second layer 126 is uninterrupted, while the third layer 128 is structured and forms a magnetically conducting individual pole 129a for each write unit 125a. The second layer 126 forms a common pole 129c for the write units 125a and 125b, while each write gap 127a is present between an individual pole 129a and the common pole 129c, and each write gap 127b is present between an individual pole 129b and the common pole 129c.

The write gaps 127a and 127b located in the mutually different planes P1 and P2 and comprising a non-magnetic material pairwise adjoin the same plane H transverse to the transverse direction W. The individual poles 129a and 129b of every two adjacent write units 125a and 125b also adjoin the same plane H.

The thin-film structure also comprises a first electric conductor 130 extending between the first and the second soft-magnetic layer 124, 126, and a second electric conductor 132 extending between the second and the third soft-magnetic layer 126, 128. Both conductors comprise two or more superjacent electrically conducting layers, two of which are shown in the embodiment, namely the electrically conducting layers 130a, 130b and 132a, 132b, respectively. The layers 132a and 132b are interconnected via through-connections 132ba. The layers 130a and 130b are interconnected in a similar way. The electric conductors 130 and 132 are provided with connections tracks 130ab and 132ab, respectively, for forming individual inductive elements similarly as shown in FIG. 2D.

The magnetic head with inductive transducing elements shown in FIGS. 3A, 3B, 3C and 3D can simply be manufactured by means of known thin-film techniques. The method to be performed for this purpose particularly comprises the following steps: providing the first magnetic layer 124; providing the electrically conducting layer 130a; providing the electrically conducting layer 130b and electrically connecting it to layer 130a; providing the second magnetic layer 126; providing the electrically conducting layer 132a; providing the electrically conducting layer 132b and electrically connecting it to the layer 132a, and providing the third magnetic layer 128.

Figure 4A:
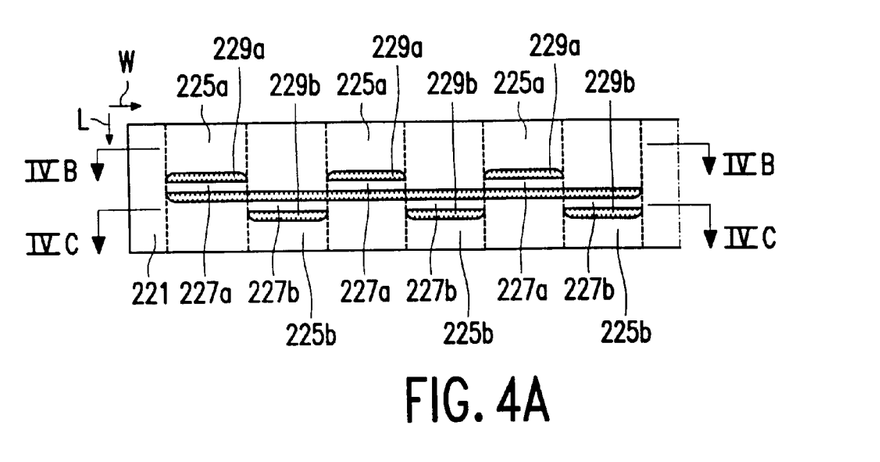
FIG. 4A is a diagrammatic front-elevational view of a third embodiment of the magnetic head according to the invention.
Figure 4B:
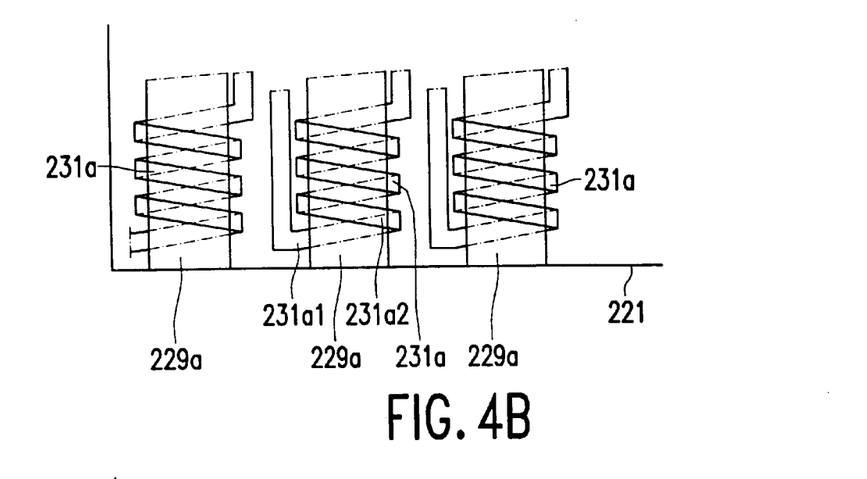
FIG. 4B is a diagrammatic cross-section taken on the line IVB—IVB of the third embodiment.
Figure 4C:
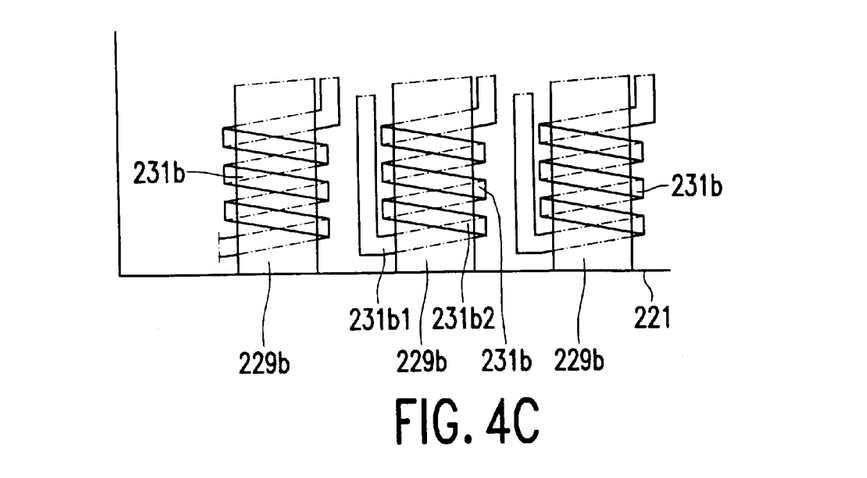
FIG. 4C is a diagrammatic cross-section taken on the line IVC—IVC of the third embodiment.

The magnetic head according to the invention, shown in FIGS. 4A, 4B and 4C is provided with a head face 221 having a longitudinal direction L and a transverse direction W. The magnetic head has a structure of integrated, juxtaposed head units 225a and 225b each extending transversely to said directions W and L. The head units 225a and 225b are provided with transducing elements 231a and 231b and have transducing gaps 227a and 227b, respectively. The transducing gaps 227a and 227b of every two adjacent head units are located in different planes oriented transversely to the longitudinal direction L, while the relevant gaps adjoin the same plane oriented transversely to the transverse direction W. The transducing gaps 227a and 227b located in different planes each extend between a magnetically conducting common pole 229c terminating in the head face 221 and an individual pole 229a, 229b terminating in the head face 221. The transducing elements 231a and 231b are write windings provided around the individual poles 229a and 229b, respectively, and formed from an electrically conducting material such as copper.

The magnetic head shown in FIGS. 4A, 4B and 4C can be manufactured in a comparatively easy way by means of known techniques, particularly thin-film techniques. The method to be performed for this purpose particularly comprises the following steps: providing first portions 231b1 of the write windings 231b; providing the individual poles 229b; providing second portions 231b2 of the write windings 231b and electrically connecting them to the first portions 231b1; providing the common pole 229c; providing first portions 231a1 of the write windings 231a; providing the individual poles 229a, and providing second portions 231a2 of the write winding 231a and electrically connecting them to the first portions 231a1.

The operation referred to as "providing" is understood to mean the deposition of a suitable material, followed by a possible structuring of the deposit. Dependent on the properties of the material to be deposited, a suitable deposition method may be sputtering, vapour deposition or another known applicable technique. When said connections are realized, use may be made of, for example etching for forming through-connection apertures.

Figure 5A:
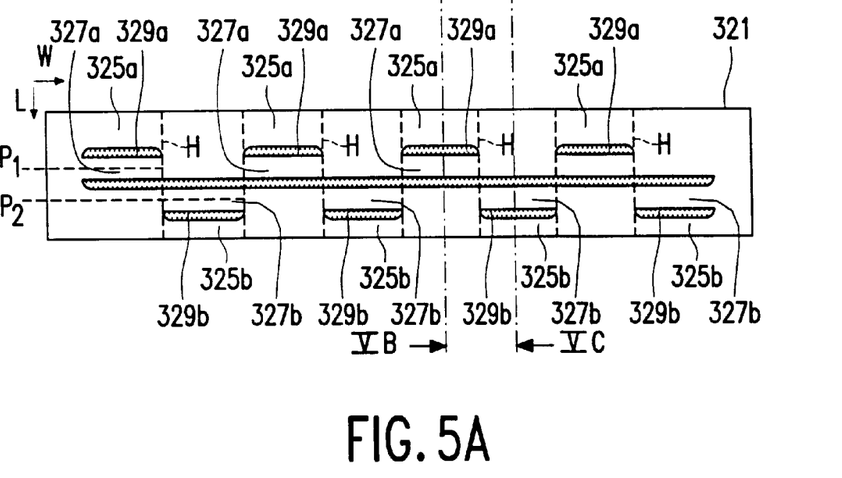
FIG. 5A is a diagrammatic front-elevational view of a fourth embodiment of the magnetic head according to the invention.
Figure 5B:
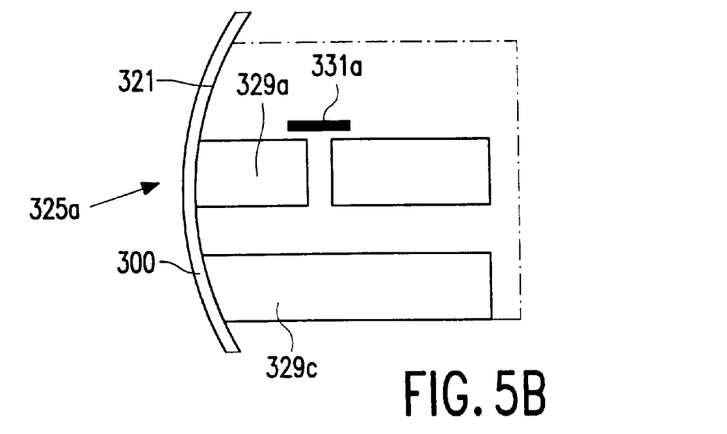
FIG. 5B is a diagrammatic cross-section taken on the line VB—VB of the fourth embodiment.
Figure 5C:
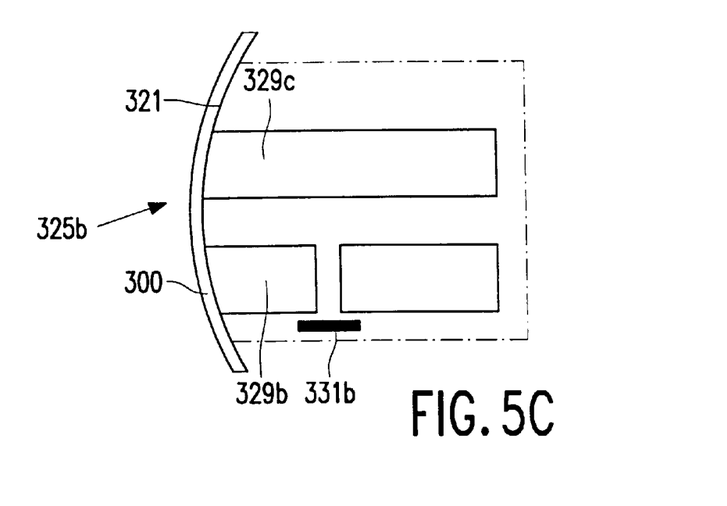
FIG. 5C is a diagrammatic cross-section taken on the line VC—VC of the fourth embodiment.

The magnetic head shown in FIGS. 5A, 5B and 5C is provided with a head face 321 having a longitudinal direction L in which a magnetic recording medium 300 is movable relative to the magnetic head, and a transverse direction W oriented transversely to the longitudinal direction. The magnetic head is also provided with transducing gaps 327a and 327b terminating in the head face 321. The magnetic head comprises a multilayer structure with integrated, juxtaposed head units extending transversely to the directions L and W, particularly read units 325a and 325b each provided with a transducing element, being a magnetoresistive element 331a, 331b, and a transducing gap, being a read gap 327a, 327b, respectively. Of two adjacent read units, a read gap 327a of the one read unit 325a and a read gap 327b of the other read unit 325b are located in mutually different planes P1 and P2 oriented transversely to the longitudinal direction L, while these read gaps adjoin the same plane H oriented transversely to the transverse direction W. The read gaps 327a and 327b, present in mutually different planes P1 and P2, of two adjacent read units extend between a magnetically conducting common pole 329c terminating in the head face 321 and an individual pole 329a, 329b terminating in the head face 321. The individual poles 329a and 329b of two adjacent read units adjoin the same plane H oriented transversely to the transverse direction W. Said structure is a multilayer structure having layers which extend substantially transversely to the head face 321. Of two adjacent read units, a read gap of the one read unit and a read gap of the other read unit are located in mutually different layers. The magnetoresistive elements 331a and 331b may be formed from, for example an NiFe alloy. In the embodiment shown, the individual poles 329a and 329b are interrupted poles, the interruption being bridged by a magnetoresistive element.

Figure 6A:
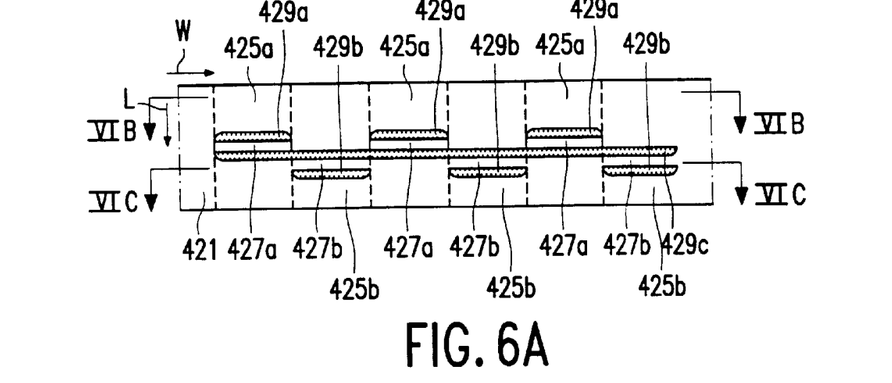
FIG. 6A is a diagrammatic front-elevational view of a fifth embodiment.
Figure 6B:
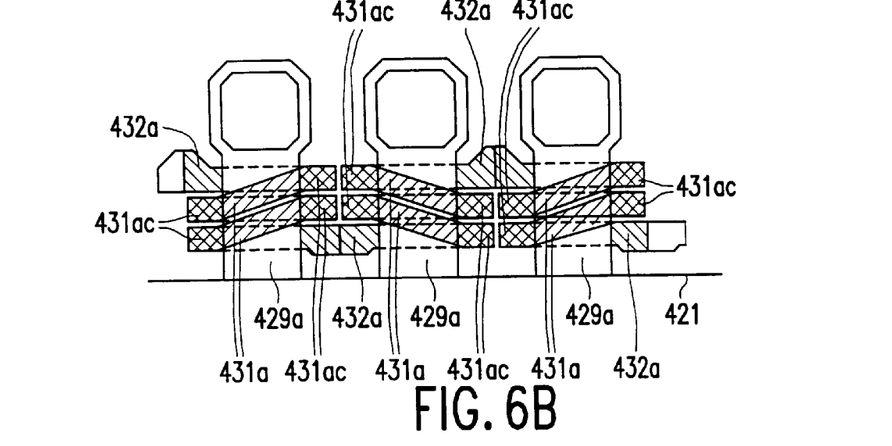
FIG. 6B is a diagrammatic cross-section taken on the line VIB—VIB of the fifth embodiment.
Figure 6C:
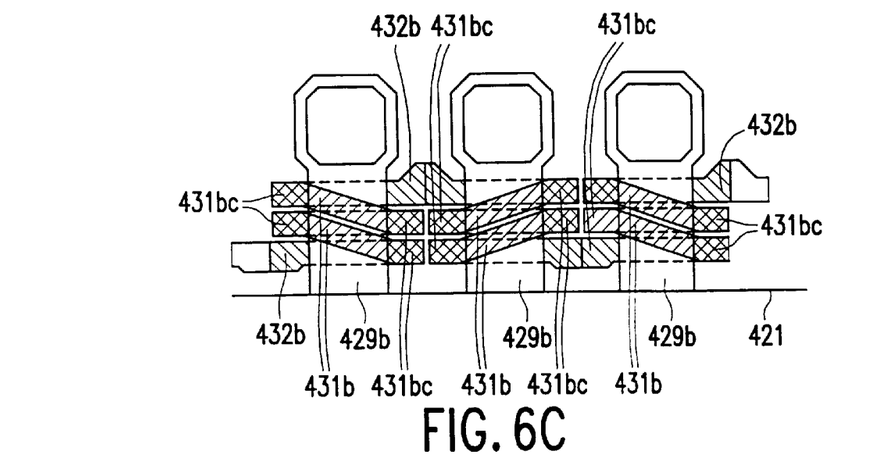
FIG. 6C is a diagrammatic cross-section taken on the line VIC—VIC of the fifth embodiment.

The magnetic head according to the invention, shown in FIGS. 6A, 6B and 6C is provided with a head face 421 having a longitudinal direction L and a transverse direction W. The magnetic head comprises a structure of integrated, juxtaposed head units 425a and 425b each extending transversely to said directions W and L. The head units 425a and 425b are provided with transducing elements 431a and 431b and have transducing gaps 427a and 427b, respectively. The transducing gaps 427a and 427b of every two adjacent head units are located in different planes oriented transversely to the longitudinal direction L, while the relevant gaps adjoin the same plane oriented transversely to the transverse direction W. The transducing gaps 427a and 427b located in mutually different planes each extend between a magnetically conducting common pole 429c terminating in the head face 421 and an individual pole 429a, 429b terminating in the head face 421. The transducing elements 431a and 431b are write windings provided around the individual poles 429a and 429b and formed from an electrically conducting material such as copper. In this embodiment, these windings are double write windings, with the parts located at different levels being interconnected.

Figure 7A:
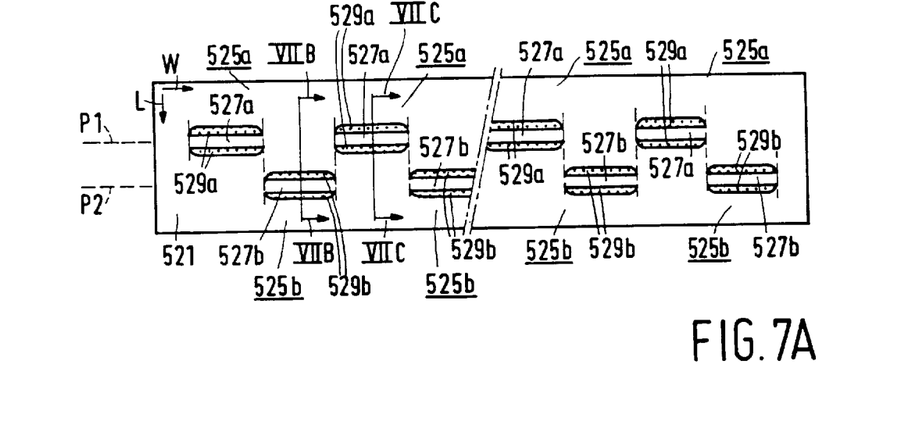
FIG. 7A is a diagrammatic front-elevational view of a sixth embodiment.
Figure 7B:
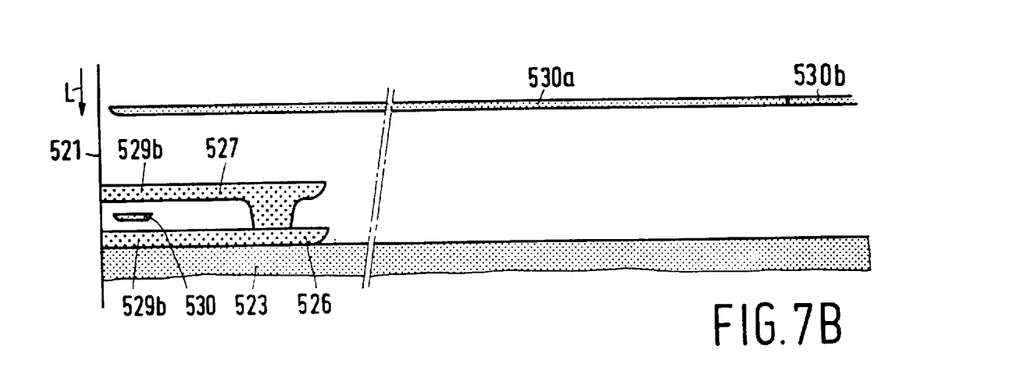
FIG. 7B is a diagrammatic cross-section taken on the line VIIB—VIIB of the sixth embodiment.
Figure 7C:
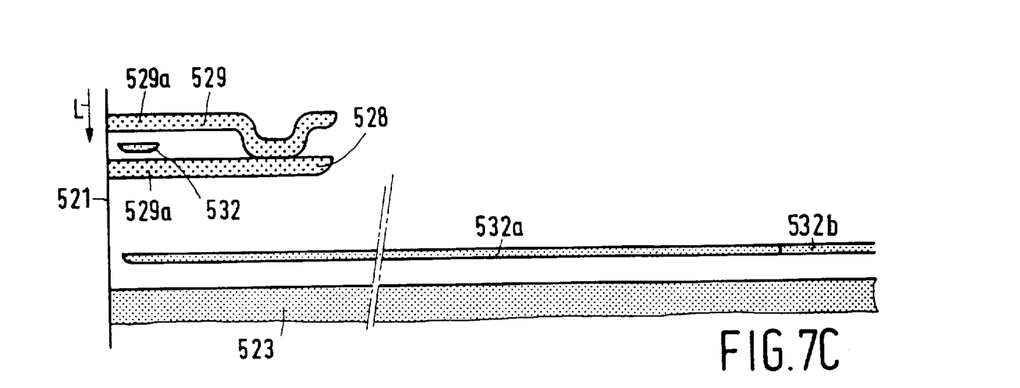
FIG. 7C is a diagrammatic cross-section taken on the line VIIC—VIIC of the sixth embodiment.

The magnetic head according to the invention, shown in FIGS. 7A, 7B and 7C is a thin-film magnetic head. The magnetic head has a head face 521 for cooperation with, for example a magnetic tape which is movable relative to the magnetic head in the direction denoted by arrow L. The direction L corresponds to the longitudinal direction of the head face 521 which has also a direction W transverse to the longitudinal direction.

The magnetic head comprises a substrate 523 of, for example $Al_2O_3$/TiC on which a multilayer structure, particularly a thin-film structure is formed. This structure has a plurality of adjoining head units 525a and 525b which extend transversely to the longitudinal direction L and the transverse direction W, which head units 525a and 525b alternate with each other. The head units 525a and 525b are provided with transducing gaps 527a and 527b, respectively, with all gaps 527a being located in a first plane P1 extending transversely to the longitudinal direction L, and all gaps 527b being located in a second plane P2 extending parallel to the first plane P1.

The multilayer structure comprises a first soft-magnetic layer 526 of, for example NiFe. The multilayer structure also comprises a second, a third and a fourth soft-magnetic layer 527, 528 and 529, respectively, extending parallel to the first layer 526. The layers 526 and 527 are structured in such a way that they constitute magnetically conducting individual poles 529b for each head unit 525b, between which poles the gaps 527b extend. The layers 528 and 529 are structured in such a way that they constitute magnetically conducting individual poles 529c for each head unit 525a, between which poles the gaps 527a extend. For forming efficient magnetic circuits, various soft-magnetic layers may be interconnected.

The transducing gaps 527a and 527b of a non-magnetic material such as $SiO_2$, present in the mutually different planes P1 and P2, pairwise adjoin the same plane H transverse to the transverse direction W. The individual poles 529a and 529b of every two adjacent head units 525a and 525b also adjoin the same plane H.

The multilayer structure also comprises a first electric conductor 530 of, for example Cu extending between the first and the second soft-magnetic layer 526, 527, and a second electric conductor 532 of, for example, Cu extending between the third and the fourth soft-magnetic layer 528, 529, respectively. The electric conductors 530 and 532 each formed by means of an electrically conducting layer each have branches in the form of connection tracks 530a and 532a for forming individual inductive elements in the magnetic circuits constituted by the poles. The connection tracks terminate in connection faces 530b and 532b.

It is to be noted that the invention is not limited to the embodiments shown. For example, the number of transducing gaps may be smaller or larger than the numbers given in the embodiments. Moreover, a magnetic head according to the invention may comprise both inductive and magnetoresistive elements. Moreover, the means used in the device according to the invention for moving the magnetic head relative to the recording medium may comprise a known construction for moving the magnetic head in a direction transverse to the direction of movement of the recording medium and in a plane oriented parallel to a recording plane of the recording medium.

We claim:

1. A magnetic head having a head face and transducing gaps terminating in the head face, the transducing gaps defining a longitudinal direction and being disposed in a narrow zone extending in a transverse direction oriented transversely to the longitudinal direction, for scanning a magnetic recording medium which is relatively movable in the longitudinal direction with respect to the magnetic head, said magnetic head comprising an integrated structure comprising a plurality of juxtaposed head units extending substantially transversely to the longitudinal direction and the transverse direction, each of said head units comprising a respective transducing element associated with a respective one of said transducing gaps, a transducing gap of a first of the head units and a transducing gap of a second of the head units adjacent the first head unit being disposed in mutually different planes oriented substantially transversely to the longitudinal direction and extending at different sides of a plane oriented substantially transversely to the longitudinal direction, said first head unit being one of a first plurality of head units disposed to a same side of said plane, said head units being disposed such that said transducing gaps are directly adjacent said plane oriented substantially transversely to the longitudinal direction, and the head units directly adjoin each other so that a recording channel density of 100% is achievable, characterized in that the head further comprises a first electrical conductor associated with the respective transducing element of each of said first plurality of head units, arranged in a plane oriented transversely to said longitudinal direction, said conductor having one portion extending through said first plurality of head units.

2. A magnetic head as claimed in claim 1, characterized in that said one portion extends along the head face through and between at least two adjoining ones of said first plurality of head units, and the head comprises a plurality of respective connection tracks connected electrically to and leading away from said first electrical conductor, for providing respective electrical connections to the transducing elements of said first plurality of head units.

3. A magnetic head as claimed in claim 2, characterized in that said transducing elements are inductive elements formed by said one portion and respective connection tracks.

4. A magnetic head as claimed in claim 3, characterized in that said one portion is arranged as respective inductive windings associated with the transducing gaps of said first plurality of head units, forming said transducing elements.

5. A magnetic head as claimed in claim 3, characterized in that the integrated structure is a multilayer structure having layers extending substantially transversely to the head face and the longitudinal direction, at least the transducing gap of the first head unit and at least the transducing gap of the second head unit being in mutually different layers.

6. A device for storing information in, and/or reading information from, a magnetic recording medium, provided with a magnetic head as claimed in claim 1 and with means for moving the magnetic head relative to the recording.

7. A magnetic head having a head face and transducing gaps terminating in the head face, the transducing gaps defining a longitudinal direction and being aligned generally in a transverse direction oriented transversely to the longitudinal direction, for scanning a magnetic recording medium which is relatively movable in the longitudinal direction with respect to the magnetic head, said magnetic head comprising an integrated structure comprising:

a plurality of juxtaposed head units extending substantially transversely to the longitudinal direction and the transverse direction, each of said head units comprising a respective transducing element associated with a respective one of said transducing gaps, a transducing gap of a first of the head units and a transducing gap of a second of the head units adjacent the first head unit being disposed in mutually different planes oriented substantially transversely to the longitudinal direction and extending at different sides of a plane oriented substantially transversely to the longitudinal direction, said first head unit being one of a first plurality of head units disposed to a same side of said plane, and said second head unit being one of a second plurality of head units disposed to a side of said plane opposite said same side, each of said head units comprising a respective transducing element associated with a respective one of said transducing gaps, a first electrical conductor associated with the first plurality of head units, one portion of the first electrical conductor extending along the head face in the transverse direction through and between at least two adjacent ones of the first plurality of head units and further extending adjacent the transducing gaps of the first plurality of head units, said one portion having first conductor areas of overlap with the respective transducing gaps of said first plurality of head units, said first conductor areas of overlap forming respective transducing elements, and a second electrical conductor associated with the second plurality of head units, a first portion of the second electrical conductor extending along the head face in the transverse direction through and between at least two adjacent ones of the second plurality of head units and further extending adjacent the transducing gaps of the second plurality of head units, the first portion having second conductor areas of overlap with the respective transducing gaps of said second plurality of head units, said second conductor areas of overlap forming respective transducing elements, second portions of the first electrical conductor forming a plurality of respective connection tracks leading away from the one portion, for providing respective electrical connections to the transducing elements of said first plurality of head units, with two adjacent transducing elements in the first plurality of head units sharing a common connection track, and second portions of the second electrical conductor forming a plurality of respective connection tracks leading away from the first portion, for providing respective electrical connections to then transducing elements of said second plurality of head units, with two adjacent transducing elements in the second plurality of head units sharing a common connection track.

8. A magnetic head as claimed in claim 7, characterized in that said plane is a central plane, said first plurality of head units are disposed in a first plane parallel to said central plane, said second cf the head units is one of a second plurality of head units disposed in a second plane disposed to a side of said central plane opposite to said same side, and the respective transducing gaps of said second plurality of head units are disposed opposite spaces between the transducing gaps of said first plurality of head units.

9. A magnetic head as claimed in claim 8, characterized in that the transducing caps of said two adjacent head units each adjoin said central plane and extend between two respective magnetically conducting individual poles terminating in the head face, one respective individual pole of each of said two adjacent head units lying in said central plane.

10. A magnetic head as claimed in claim 8, characterized in that the transducing gaps of said two adjacent head units each adjoin said central plane and extend between a respective magnetically conducting individual pole terminating in the head face, a common pole lying in said central plane.

11. A magnetic head as claimed in claim 8, characterized in that the integrated structure is a multilayer structure having layers extending substantially transversely to the head face and the longitudinal direction, at least the transducing gap of the first head unit and at least the transducing gap of the second head unit being in mutually different layers.

12. A magnetic head as claimed in claim 8, characterized in that said transducing elements are inductive elements, formed for said first plurality of head units by said one portion and respective connection tracks, and formed for said second plurality of head units by said first portion and respective connection tracks.

13. A magnetic head as claimed in claim 12, characterized in that said one portion is arranged as respective inductive windings associated with the transducing gaps of said first plurality of head units, forming said transducing elements.

14. A magnetic head as claimed in claim 12, characterized in that the integrated structure is a multilayer structure having layers extending substantially transversely to the head face and the longitudinal direction, at least the transducing gap of the first head unit and at least the transducing gap of the second head unit being in mutually different layers.

15. A device for storing information in, and/or reading information from, a magnetic recording medium, provided with a magnetic head as claimed in claim 7 and with means for moving the magnetic head relative to the recording.

16. A magnetic head having a head face and transducing gaps terminating in the head face, the transducing gaps defining a longitudinal direction and being disposed in a narrow zone extending in a transverse direction oriented transversely to the longitudinal direction, for scanning a magnetic recording medium which is relatively movable in the longitudinal direction with respect to the magnetic head, said magnetic head comprising an integrated structure comprising a plurality of juxtaposed head units extending substantially transversely to the longitudinal direction and the transverse direction, each of said head units comprising a respective transducing element associated with a respective one of said transducing gaps, a transducing gap of a first of the head units and a transducing gap of a second of the head units adjacent the first head unit being disposed in mutually different planes oriented substantially transversely to the longitudinal direction and extending at different sides of a plane oriented substantially transversely to the longitudinal direction, said first head unit being one of a first plurality of head units disposed to a same side of said plane, said head units being disposed such that said transducing gaps are directly adjacent said plane oriented substantially transversely to the longitudinal direction, and the head units directly adjoin each other so that a recording channel density of 100% is achievable, characterized in that each of said first plurality of head units includes a respective pole element arranged parallel to said plane and extending away from the respective transducing gap, and a respective electrical conductor associated with the respective transducing element of each of said first plurality of head units, the pole element of said first head unit being a first pole unit, the electrical conductor of said first head unit having a first portion arranged between the first pole element and the respective pole element of an adjoining head unit of said first plurality of head units and extending away from the head face; a plurality of second portions extending transversely to said first portion to one side of said first pole element; a plurality of third portions extending transversely to said first portion to the other side of said first pole element, each of said second portions having at least one end connected electrically to a respective end of one of said third portions so as to form an electrically conducting coil around the pole element; and a fourth portion extending away from the pole face, said first portion being connected electrically to one end of a first of said second portions at a location adjacent the head face, said fourth portion being connected electrically to the other end of said coil at a location remote from the head face, and at least one electrical connection between one of said second portions and one of said third portions being disposed between said first portion and the first pole element.

17. A magnetic head as claimed in claim 16, characterized in that said first and fourth portions of said electrical conductor lie substantially in a same plane.

18. A magnetic head as claimed in claim 16, characterized in that said second portions lie substantially in said same plane.

* * * * *